United States Patent

Long et al.

[11] Patent Number: 6,155,949
[45] Date of Patent: Dec. 5, 2000

[54] MULTIPLE GAIN TRIM VALVE FOR A SELECTIVELY ENGAGEABLE FRICTION DEVICE

[75] Inventors: Charles Francis Long, Pittsboro; Jeffrey Jay Cole, Plainfield; Martin Robert Dadel, Indianapolis, all of Ind.

[73] Assignee: General Motors Corporation, Detroit, Mich.

[21] Appl. No.: 09/332,848

[22] Filed: Jun. 14, 1999

[51] Int. Cl.$^7$ .................................................. F16H 61/04
[52] U.S. Cl. .......................................... 475/127; 475/128
[58] Field of Search ................................... 475/120, 127, 475/128, 129

[56] References Cited

U.S. PATENT DOCUMENTS

| | | | |
|---|---|---|---|
| 3,754,483 | 8/1973 | Edmunds | 475/129 |
| 4,422,536 | 12/1983 | Shatuck | 475/128 |
| 5,509,868 | 4/1996 | Eaton | 475/119 |
| 5,601,506 | 2/1997 | Long et al. | 475/120 |
| 5,616,093 | 4/1997 | Long et al. | 475/120 |
| 5,911,244 | 6/1999 | Long et al. | 137/625.64 |

*Primary Examiner*—Sherry L. Estremsky
*Attorney, Agent, or Firm*—Dean L. Ellis

[57] ABSTRACT

A control for a multi-speed transmission has a multiple gain trim valve that controls the engagement pressure rise in a selectively engageable torque transmitting mechanism. The trim valve has a valve spool and a plug valve longitudinally aligned in a valve bore such that four separate areas are present. One of the areas has the engagement pressure of the torque transmitting mechanism imposed thereon. Another of the areas has a control pressure imposed thereon and the remaining two areas are subjected to the trim pressure. The gain rate between the trim pressure and the engagement pressure determines the rapidity with which the torque transmitting mechanism is engaged. The control pressure reduces the effect of the trim pressure to provide a low gain rate until the product of the trim pressure and one of the areas is equal to or greater than the product of the control pressure and the area on which it operates. By reducing the control pressure to a zero value, a maximum gain rate is attained at the trim valve.

3 Claims, 2 Drawing Sheets

MULTIPLE GAIN TRIM VALVE FOR A SELECTIVELY ENGAGEABLE FRICTION DEVICE

TECHNICAL FIELD

This invention relates to trim valves for providing hydraulic pressure regulation of the engagement pressure in selectively engageable friction devices.

BACKGROUND OF THE INVENTION

Many modern automatic transmissions use trim valves to control the pressure rise of apply pressure in an oncoming friction device such as a disc clutch or disc brake. The trim valve controls the apply pressure increase from a value sufficient to overcome the piston return springs to full engagement pressure. The maximum full engagement pressure occurs during vehicle operation requiring maximum engine torque and in some instances, maximum engine torque multiplied by the torque ratio of the torque converter which can be as high as 3.0.

The system requires that the pressure be controlled between 0 (zero) and 250 psi. This pressure range, in current transmissions, is generally a straight-line function. With the current range of pressure available from conventional trim valves, this requires a 3 to 1 pressure gain. For example, if the apply pressure is from 9 to 270 psi, the trim pressure is from 3 to 90 psi which is consistent with current valve technology. The trim pressure control at the lower end of the range is very important since during this portion of the apply function it is necessary to overcome the piston return springs and initiate friction engagement. If the pressure rise is too rapid, a harsh "shift feel" will occur.

With currently available trim valves, the pressure must be controlled in the range of 3 to 5 psi (9 to 15 psi apply pressure) to accommodate this function. Thus extremely accurate controls are necessary. This situation is exacerbated by the need to provide the control of apply under a plurality of throttle conditions, including a full throttle maximum condition.

U.S. Pat. No. 5,911,244, assigned to the assignee of this application, describes a pressure control trim valve arrangement for providing two distinct increasing pressure functions for the engagement pressure versus the control pressure. While this system is effective, it requires the installation of two spool valves, a plug valve, and three bias springs. The trim pressure control disclosed in the copending application provides two distinct apply pressure functions each providing two distinct pressure gain rates.

SUMMARY OF THE INVENTION

It is an object of the present invention to provide an improved regulator valve for controlling the engagement pressure of a selectively engageable, fluid operated friction device.

In one aspect of the present invention, a spool valve having a differential area subjected to engagement pressure and a control area subjected to trim control pressure, and plug valve subjected to trim control pressure are combined in a valve bore to provide a single gain rate between the engagement pressure and the trim control pressure. In another aspect of the present invention, a differential area on the plug valve is pressurized by a secondary control pressure at a predetermined level in opposition to the trim pressure to thereby effect a dual gain rate engagement pressure.

In yet another aspect of the present invention when the secondary control pressure is exhausted, the gain rate is a straight line function. In a further aspect of the present invention when a secondary control pressure is present the gain rate has a first low straight line function and a second high straight line function with a knee at the juncture of the two gain rates. In yet a further aspect of the present invention, the position of the knee is determined at least partially by the secondary control pressure.

The present invention is useful in many currently available control systems including those described in U.S. Pat. Nos. 5,601,506 and 5,616,093 which are assigned to the assignee of this application. Those skilled in the art will also recognize the usefulness of this trim valve arrangement in other control systems. The valve arrangement incorporating the present invention improves the accuracy of the engagement pressure level in an oncoming friction device during a ratio interchange. The present invention reduces the variation in the engagement pressure that might occur due to external factors such as engine speed, temperature and control current fluctuations at the solenoids.

The present invention has a single spool valve and plug valve that cooperate to provides a controlled engagement pressure at a high gain rate (4.2 to 1.0). The spool valve can be employed separately during a portion of the trim function of the engagement pressure and in concert with the plug valve during the remainder of the trim function to provide a variable gain rate. The variable gain rate has a low initial stage gain rate in a range of 1.0 to 1.0 and 1.96 to 1.0 and a high stage gain rate of 4.2 to 1.0. This results in an overall gain rate less than 4.2.0 to 1.0. The present invention has an advantage over the above mentioned U.S. Pat. No. 5,911,244 in that a secondary spool valve and a plug valve bias spring are not required thus reducing the space requirement and number of components.

DESCRIPTION OF AN EXEMPLARY EMBODIMENT

Figure 1:
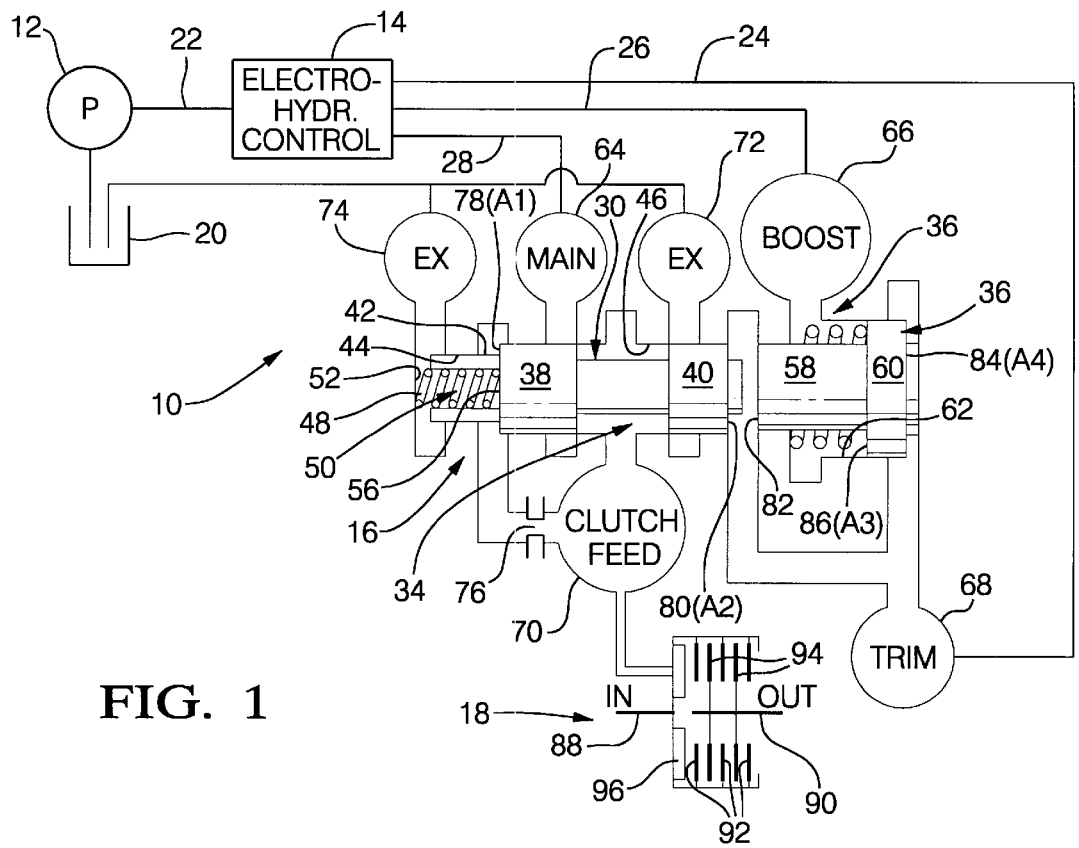
FIG. 1 is a diagrammatic representation of a control system for a power transmission incorporating the present invention with a trim valve in a high gain position.
Figure 2:
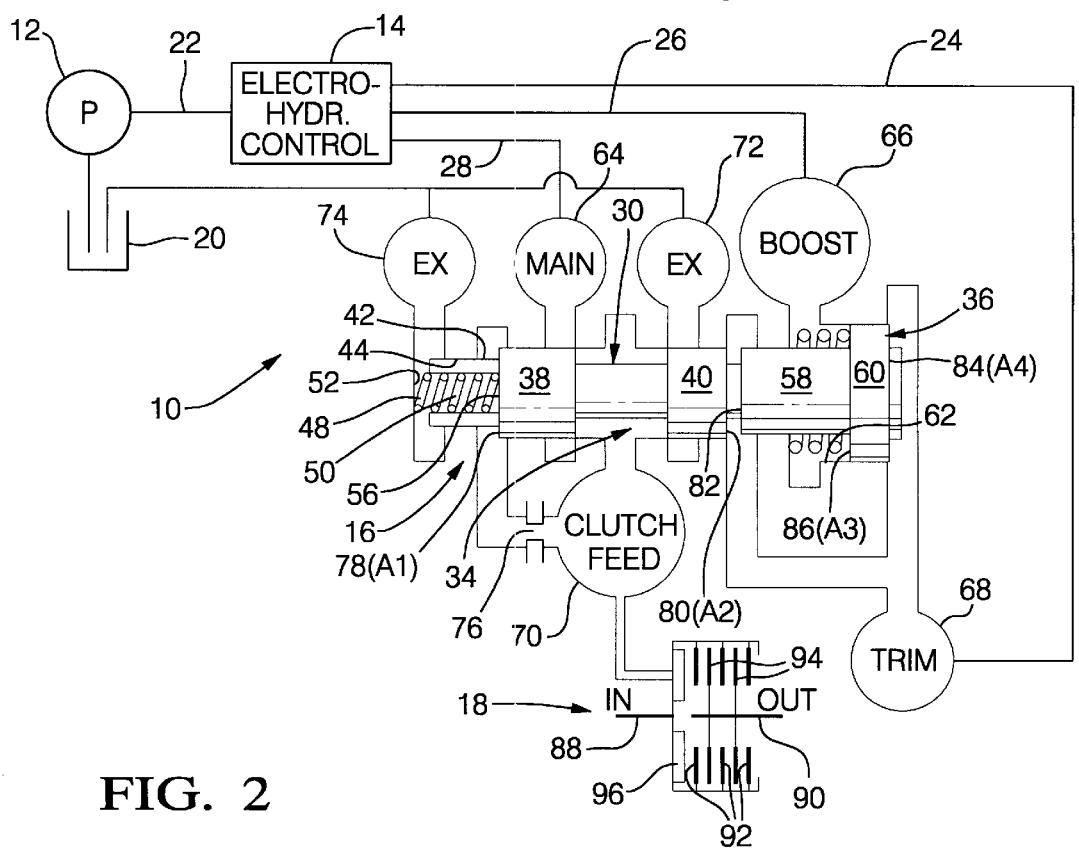
FIG. 2 is a diagrammatic representation similar to FIG. 1 with the trim valve in a low gain position.

Referring to the drawings wherein like characters represent the same or corresponding parts throughout the several views, there is seen in FIGS. 1 and 2 a portion of a transmission control system 10 including a pump 12, an electro-hydraulic control 14 a trim valve 16 and a torque transmitting mechanism 18. The pump 12 is a conventional positive displacement mechanism that draws hydraulic fluid from a reservoir 20 and delivers the fluid to the electro-hydraulic control 14 through a main passage 22.

The electro-hydraulic control 14 includes an electronic control unit (ECU) having a conventional preprogrammed digital computer and the control 14 also includes conventional control valves that distribute hydraulic fluid to the many devices in an automatic transmission including the torque transmitting mechanisms. The ECU, as is well-known, emits electrical control signals to various electronic elements such as solenoids that in turn control the output pressure of the hydraulic valves. The electro-hydraulic control produces a variable hydraulic trim control signal that is distributed through a trim passage 24 and a hydraulic boost defeat control signal that is distributed through a passage 26. The electro-hydraulic control 14 also provides a main pressure hydraulic fluid in a main passage 28. One such transmission control system that can be advantageously improved with this invention is shown in U.S. Pat. No. 5,616,093 issued to Long et al. on Apr. 1, 1997 and assigned to the assignee of this application which is specifically incorporated herein by reference.

The trim valve 16 has a spool valve 30 and a plug valve 32 slidably disposed in concentric longitudinal arrangement in a stepped valve bore 34 that is formed in a valve body 36. The valve spool valve 30 has spaced equal diameter lands 38 and 40, and a smaller end land 42. The end land 42 is positioned in a small diameter 44 of the bore 34 and the lands are positioned in a intermediate diameter 46 of the bore 34. A bias spring 48 is located in a spring pocket 50 formed in the spool valve 30. The spring 48 is compressed between one end 52 of the bore 34 and an end 56 of the spring pocket 50. The spring 48 imposes a bias force (Fs) on the spool valve 30 urge the spool valve 30 rightward as viewed in FIGS. 1 and 2. The plug valve 32 has a small land 58 slidably disposed in the intermediate diameter 46 and large land 60 slidably disposed in a large diameter 62 of the bore 34.

The valve body 36 has a main pressure port 64 connected with the passage 28, a boost control port 66 connected with the passage 26, a trim pressure port 68 connected with the passage 24, a device feed port 70 communicating with the torque transmitting mechanism 18 and a pair of exhaust ports 72 and 74 communicating with the reservoir 20. The feed port 70 is in fluid communication with a space 76 between the lands 38 and 40. The main port 64 is selectively opened and closed by the land 38. The exhaust port 72 is selectively opened and closed by the land 40. When the main port 64 is opened by the land 38, main pressure in the passage 64 is communicated to the port 70 and when the exhaust port 72 is opened, the port 70 communicates with exhaust. The ports 64 and 72 are controlled by the lands 38 and 40 to control the fluid flow and therefore the pressure that is communicated to the port 70 in a well-known manner. The pressure in the port 70 is communicated through a restriction or orifice 76 to a pressure responsive differential area 78 (A1) formed by the lands 38 and 42.

The trim port 68 is in fluid communication with the bore 34 between one end 80 of the land 40 of the spool valve 30 and one end 82 of the land 58 of the plug valve 32. The end 80 cooperates with the bore 34 to form a pressure responsive area (A2). The pressure in the trim port 68 urges separation of the spool valve 30 and the plug valve 32. The pressure between the lands 40 and 58 also urges the spool valve 34 leftward against the spring 48. The pressure in the trim port 68 also acts on a pressure responsive area (A4) formed by the bore 34 and the end 84 of the plug valve 32 to urge the plug valve leftward. The pressure on the end 84 is counteracted by a selectively issued boost control pressure at the port 66 which reacts on a pressure responsive differential area 86 (A3) between the lands 58 and 60 and the bore 34.

The torque transmitting mechanism 18 is a conventional selectively operable fluid actuated friction device such as a clutch or brake. The mechanism 18 includes an input member 88, an output member 90, a plurality of friction members 92 connected with the input member 88, a plurality of friction members 94 connected with the output member 90 and a fluid operated piston 96 that communicates with the feed port 70.

When the mechanism 18 is employed as a clutch, the input member 88 will usually be a power shaft and the output member 90 will generally be a gear member. When the mechanism 18 is a brake, the input member 88 will usually be connected with a gear member and the output member 90 will generally be connected with a stationary member such as the transmission housing. The operation of these devices is well-known. In operation the piston 96 is pressurized to force frictional engagement of the friction members 92 and 94. Those skilled in the art also recognize that the pressure rise at the piston is important for the smooth operation of the transmission in which the mechanism 18 is employed. The pressure rise at the piston 96 and the ultimate engagement pressure is to be controlled to effect smooth operation of the transmission. The trim valve 16 is beneficial in attaining these ends.

During high torque conditions, such as reverse drive or manual low range, a more rapid rise in the engagement pressure at the torque transmitting mechanism is required. The trim valve 16 satisfies this condition by providing the gain curve 98 shown in FIG. 3. This curve 96, which is a function of signal pressure (trim pressure Pt) versus engagement pressure (Pc), is a straight line function. The trim valve 16 and the control 14 provide this function by reducing the pressure in passage 26 and therefore the boost control port 66 to zero gage pressure. With this condition, the trim pressure at port 68 will be effective on the entire area (A4) of the end 84 of the plug valve 32 while the piston engagement pressure at the port 70 acts on the differential area 78 (A1). By controlling the ratio of A4/A1 during the design of the trim valve 16, the gain rate can be controlled. This can be stated in equation form as $Pc=Pt*(A4/A1)-Fs/A1$. In at least one transmission family, the gain rate is in the range of 3.4 to 4.2. In other words for each 10 psi increase in trim pressure (Pt), the engagement pressure (Pc) will increase either 34 or 42 psi depending on the particular transmission.

During other driving conditions, such as low throttle, it is desirable to have a lower initial gain rate an a higher final gain rate. The differential area 86 (A3) is pressurized with a control pressure (Pb) during these conditions. With the differential area 86 pressurized, the plug valve 32 is initially ineffective when the control pressure Pb is greater than the trim pressure Pt. During this period as represented by curve 100 in FIG. 3, the gain rate of engagement pressure Pc to trim pressure Pt is determined by the area ratio A2/A1. This can be stated in equation form as $Pc=Pt*(A2/A1)-Fs/A1$. The area A2 is equal to the quantity (A4−A3).

Figure 3:
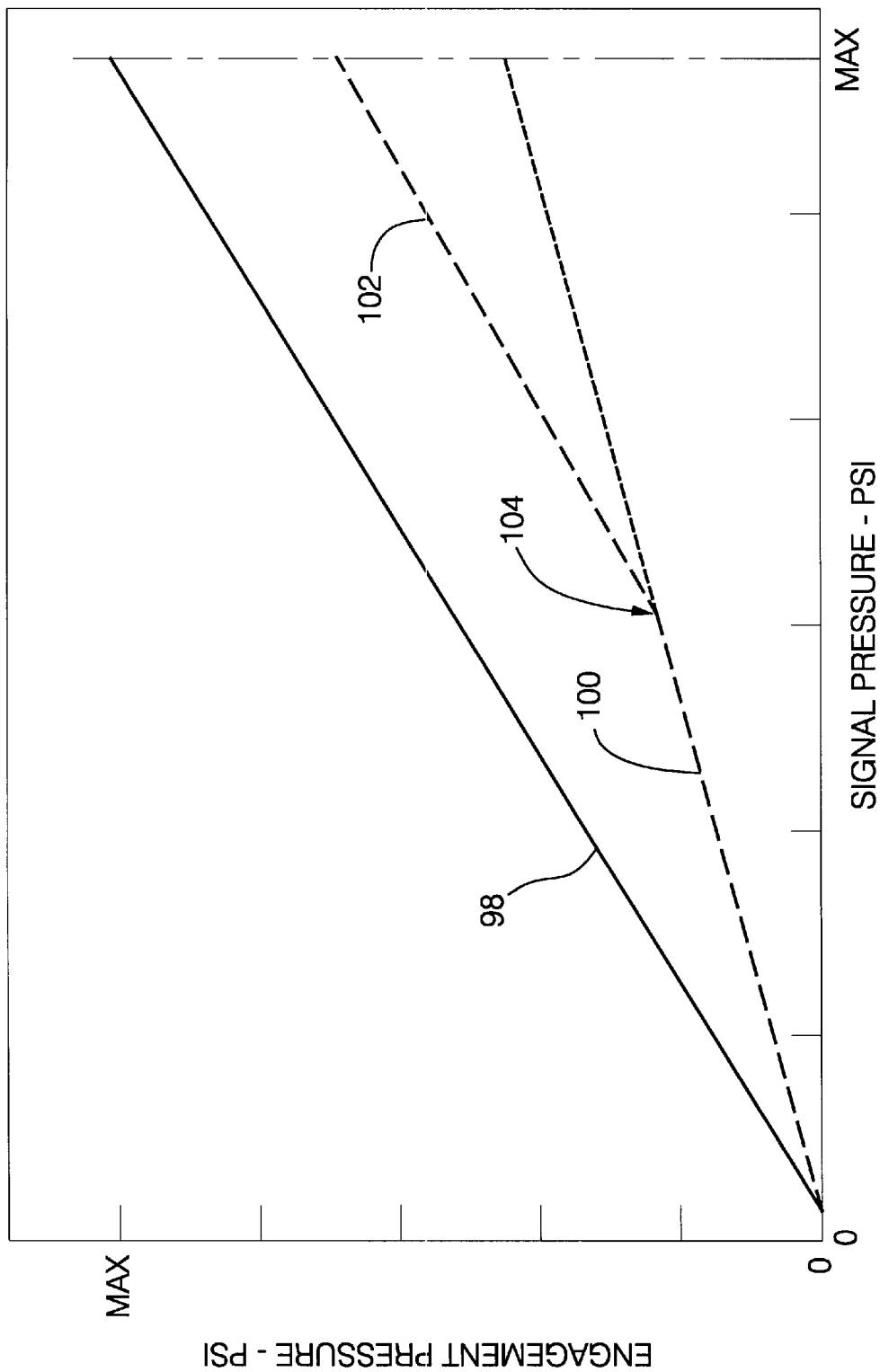
FIG. 3 is a graph depicting the signal pressure versus engagement pressure for the various operating conditions of the trim valve.

However, when the trim pressure Pt is equal to or greater than the control pressure Pb, the gain rate is proportional to the area ratio A4/A1 as represented by the curve 102 in FIG. 3. This can be stated in equation form as $Pc=Pt*(A4/A1)-Pb*(A3/A1)-Fs/A1$. It should be noted that in the example provided, the pressure Pb is a constant as is the spring force Fs for all practical purposes. Thus the equation can be restated as $Pc=Pt*(A4/A1)-K$, where K is a constant representing the influence of the spring 48 and the boost control pressure Pb. As described above, this is the high gain ratio and it should be noted that the curve 102 is parallel with the curve 98.

A knee 104, as seen in FIG. 3, occurs at the junction of the curves 100 and 102. The position of the knee 104 is controlled by the design values of the areas involved and by the pressure level of the control pressure Pb. As the value of the control pressure Pb is increased, the higher the trim pressure Pt will need to be to arrive at the knee 104. Depending on a particular transmission application, the value of the control pressure Pb can be varied by making it directly or indirectly proportional to a variable pressure in the control 14, such as the throttle position pressure. If desired, the control pressure Pb can be a constant such that the knee 104 will occur at the same value of trim pressure during all low gain operations.

What is claimed is:

1. A transmission control system having a trim valve for controlling the engagement pressure of a torque transmitting mechanism comprising:

a pressure source;

means for distributing a trim control pressure, a boost control pressure and a main pressure from said pressure source;

a valve body including a main pressure port connected with said main pressure distributing means, a trim pressure port being connected with said trim control pressure distributing means, a boost control pressure port being connected with said boost control pressure distributing means an exhaust port and a feed port connected with the torque transmitting mechanism;

said trim valve comprising a spool valve slidably disposed in a valve bore in said valve body, a plug valve slidably disposed in said valve bore, said valve bore cooperating with said spool valve to form first responsive area connected with said feed port and second pressure responsive area connected with said trim pressure port, and cooperating with said plug valve to form third pressure responsive area connected with said boost control pressure port and fourth pressure responsive area connected with said trim pressure port, said spool valve being responsive to pressure in said first and fourth pressure responsive areas to control distribution of fluid between said feed port and said main port and said exhaust port when said boost control pressure port is not pressurized, and said spool valve being responsive to pressure in said first pressure responsive area, said second pressure responsive area when said boost control pressure is at a first pressure level and said trim control pressure is at or below a second predetermined level and being responsive to said first pressure responsive area, said third pressure responsive area and said fourth pressure responsive area when said trim pressure is above said second predetermined level and said boost pressure is at said first predetermined level.

2. The transmission control system having a trim valve defined in claim 1 further comprising:

said first and third pressure responsive areas being responsive to pressure therein to urge said spool valve to connect said feed port with said exhaust port and said second and fourth pressure responsive areas being responsive to pressure to urge said spool valve to connect said main port with said feed port.

3. A transmission control system having a trim valve for controlling the engagement pressure (Pc) of a torque transmitting mechanism comprising:

a pressure source;

means for distributing a trim control pressure (Pt), a boost control pressure (Pb) and a main pressure from said pressure source;

a valve body including a main pressure port connected with said main pressure distributing means, a trim pressure port being connected with said trim control pressure distributing means, a boost control pressure port being connected with said boost control pressure distributing means an exhaust port and a feed port connected with the torque transmitting mechanism;

said trim valve comprising a spool valve slidably disposed in a valve bore in said valve body, a plug valve slidably disposed in said valve bore, said valve bore cooperating with said spool valve to form first responsive area (A1) connected with said feed port and second pressure responsive area (A2) connected with said trim pressure port, and cooperating with said plug valve to form third pressure responsive area (A3) connected with said boost control pressure port and fourth pressure responsive area (A4) connected with said trim pressure port;

and a bias spring imposing a force (Fs) on said spool valve; and said trim valve providing a pressure gain curve defined by the value Pc/Pt, including a first gain curve defined by Pc=Pt*(A4/A1)−(Fs/A1) when a boost control pressure is not present and a second gain curve having a first phase defined by Pc=Pt*(A2/A1)−(Fs/A1) when Pt<Pb and a second phase defined by Pc=Pt*A4/A1)−Pb*(A3/A1)−(Fs/A1) when Pt>Pb.

* * * * *